(12) United States Patent
Koyama

(10) Patent No.: US 6,260,974 B1
(45) Date of Patent: *Jul. 17, 2001

(54) IMAGE PROJECTING APPARATUS

(75) Inventor: Osamu Koyama, Hachioji (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/949,937

(22) Filed: Oct. 14, 1997

(30) Foreign Application Priority Data

Oct. 14, 1996 (JP) .................................... 8-270691

(51) Int. Cl.[7] .................................................. G03B 21/14
(52) U.S. Cl. .......................................... 353/98; 353/102
(58) Field of Search ............................... 353/30, 31, 34, 353/33, 25, 122, 102, 98; 359/855, 861, 868

(56) References Cited

U.S. PATENT DOCUMENTS

| | | | |
|---|---|---|---|
| 3,600,568 | * 8/1971 | Weyrauch | 353/102 |
| 4,629,298 | * 12/1986 | Trumbull | 353/30 |
| 4,787,013 | * 11/1988 | Sugino | 362/32 |
| 4,918,583 | * 4/1990 | Kudo | 362/268 |
| 4,998,191 | * 3/1991 | Tejima | 362/333 |
| 5,634,704 | * 6/1997 | Shikama | 353/31 |
| 5,648,860 | * 7/1997 | Ooi | 353/34 |
| 5,755,501 | * 5/1998 | Shinohara et al. | 353/31 |
| 5,777,789 | * 7/1998 | Chiu | 353/33 |
| 5,777,804 | * 7/1998 | Nakamura et al. | 353/98 |
| 5,800,033 | * 9/1998 | Funanami | 353/97 |
| 5,801,795 | * 9/1998 | Ogino | 349/5 |

FOREIGN PATENT DOCUMENTS

| | | | |
|---|---|---|---|
| 3811-610 | * 10/1989 | (DE) | 359/855 |
| 6-265842 | * 9/1994 | (JP) | 353/30 |

* cited by examiner

*Primary Examiner*—William Dowling
(74) *Attorney, Agent, or Firm*—Morgan & Finnegan, L.L.P.

(57) ABSTRACT

An image projecting apparatus comprises an optical element including a first end surface, a second end surface and a reflection surface for connecting the first and second surfaces and constructed so that light beams are incident on the first end surface, and at least some of the light beams are reflected by the reflecting surface and emerge from the second end surface. The apparatus also comprises a reflection type optical modulating device for modulating the light beams from the second end surface, and a projection optical system for projecting an image of the reflection type optical modulating device on a screen. The first end surface of the optical element is supplied with a light source or a light source image. A position of the first end surface of the optical element and a position of a stop of the projection optical system are set in a conjugate relationship. A position of the second end surface of the optical element and a position of the reflection type optical modulating device are set in the conjugate relationship.

7 Claims, 10 Drawing Sheets

IMAGE PROJECTING APPARATUS

BACKGROUND OF THE INVENTION

1. Field of the Invention

The present invention relates to an image projecting apparatus for enlargingly projecting an image formed by an optical modulating device such as a liquid crystal panel on a display surface such as a screen.

2. Related Background Art

An optical system for a liquid crystal projector using a reflection type liquid crystal device is proposed in Japanese Patent Application Laid-Open No. 6-265842. This optical system is known as the Schlieren optical system. The prior art optical system will be explained with reference to FIG. 1.

Referring to FIG. 1, light beams from a light source 1 are substantially collimated by a paraboloidal reflector 2 (a paraboloidal mirror) and, after being reflected by a mirror 3, a light source image is formed in the vicinity of a reflecting mirror 7 disposed in a position of an aperture stop 13 of a projection lens 14. The light beams reflected by the reflecting mirror 7 outgo toward a plano-convex lens 8 and become parallel light beams through the plano-convex lens 8. The light beams are then separated into the light beams of three colors R, G, B by a cross dichroic prism 9, on the light beams in the respective colors (wavelength bands) illuminate reflection type liquid crystal display panels 10, 11, 12.

The respective color light beams modulated by the reflection type liquid crystal panels 10, 11, 12 are color-synthesized as the reflected light beams having image information again by the cross dichroic prism 9, and converged by the plano-convex lens 8. Then, the converged light beams pass through an aperture of the aperture stop 13 and are projected onto a screen 15 via the projection lens 14.

The liquid crystal panels 10, 11, 12, within which polymer dispersion type liquid crystals are sealed, control directions of liquid crystal particles by electric fields so as to reflect incident light beams by becoming transparent when displaying a white level and scatter the incident light beams when displaying a black level. The light beams, which have been reflected by the liquid crystal panel and color-synthesized by the cross dichroic prism 9, are converged in the vicinity of the aperture stop 13 of the projection lens 14 by the plano-convex lens 8. Most of the light beams reflected by the liquid crystals pass through the aperture of the aperture stop 13. After traveling through the projection lens 14, they are displayed as the white level on the screen 15. However, an extremely small quantity of the whole light beams scatter by the liquid crystals just pass through the aperture of the aperture stop 13 and therefore appear as the black level on the screen 15.

According to the prior art, however, there arises a problem in which a color ununiformity and a luminance ununiformity of the light source occur on the screen. Further, the light source image formed by the reflector exhibits a rotation symmetry, and hence there might be a large loss of light quantity when illuminating a rectangular liquid crystal panel, resulting in such a problem that the luminance on the screen decreases.

It can be considered that an integrator is introduced in order to solve this problem, however, the light source image formed at the aperture of the aperture stop 13 of the projection lens 14 is destined to be enlarged only by simply disposing the integrator, and the quantity of the light passing through the aperture of the aperture stop 13 decreases when displaying the white level. Further, when aperture of the stop is widened to prevent the reduction in the optical quantity, the contrast is destined to be declined. Thus, the integrator effective for decreasing the color ununiformity and the luminance ununiformity on the screen is no good in terms of compatibility with the Schlieren optical system.

SUMMARY OF THE INVENTION

It is a primary object of the present invention, which obviates the problems described above, to provide an image projecting apparatus capable of reducing a color ununiformity and a luminance ununiformity of projection image on a screen and obtaining a bright and high contrast of projection image by corners of the screen.

It is another object of the present invention to provide an improved illuminating apparatus.

According to one aspect of the present invention, an image projecting apparatus comprises an optical element having a first end surface, a second end surface and a reflection surface for connecting the first and second surfaces and constructed so that light beams are incident on the first end surface, and at least some of the light beams are reflected by the reflecting surface and outgone from the second end surface. The image projecting apparatus also comprises a reflection type optical modulating device for modulating the light beams outgoing from the second end surface, and a projection optical system for projecting an image of the reflection type optical modulating device onto a screen. The first end surface of the optical element is provided with a light source or a light source image. A position of the first end surface of the optical element and a position of a stop of the projection optical system are set in a conjugate relationship. A position of the second end surface of the optical element and a position of the reflection type optical modulating device are set in the conjugate relationship.

According to another aspect of the present invention, an image projecting apparatus comprises a light source, converging means for converging light beams from the light source and forming a light source image, and an optical means having a first end surface, a second end surface and a reflecting surface for connecting the first and second end surfaces, and constructed so that the light beams from the light source are incident on the first end surface, and at least some of the light beams are reflected by the reflecting surface and outgone from the second end surface.

The image projecting apparatus also comprises a light beam deflecting element for deflecting the light beams from the second end surface of the optical element and guiding the deflected light beams to the reflection type optical modulating device, a projection lens for projecting an image of the reflection type optical modulating device onto a screen, and a condenser lens for converging the light beams modulated by the reflection type optical modulating device at a position of a stop of the projection lens, the light beam deflecting element being disposed in the vicinity of the position of the stop of the projection lens. The first end surface of the optical element is disposed in a position where the light source image is formed. A position of the first end surface of the optical element and a position of the light beam deflecting element are set in a conjugate relationship. A position of the light beam deflecting element and the position of the stop of the projection lens are set in the conjugate relationship. A position of the second end surface of the optical element and the position of the reflection type optical modulating device are set in the conjugate relationship.

According to still another aspect of the present invention, an image projecting apparatus comprises an optical element having a first end surface, a second end surface and a reflection surface for connecting the first and second surfaces and constructed so that light beams are incident on the first end surface, and at least some of the light beams are reflected by the reflecting surface and emerge from the second end surface. The image projecting apparatus also comprises an optical modulating device for modulating the light beams outgoing from the second end surface, and a projecting element for projecting an image of the optical modulating device onto a display surface such as screen. Sizes of the first and second end surfaces of the optical element are made different from each other. The first end surface of the optical element is supplied with a light source or a light source image. A position of the first end surface of the optical element and a position of a stop of the projection optical system are set in a conjugate relationship. A position of the second end surface of the optical element and a position of the optical modulating device are set in the conjugate relationship.

According to a further aspect of the present invention, an illuminating apparatus comprises an optical element having a first end surface, a second end surface and a reflection surface for connecting the first and second surfaces and constructed so that light beams are incident on the first end surface, and at least a part of the light beams is reflected by the reflecting surface and outgone from the second end surface, an illuminated surface being illuminated with the light beams outgoing from the second end surface. Sizes of the first and second end surfaces of the optical element are made different from each other. The first end surface of the optical element is provided with a light source or a light source image. A position of the second end surface of the optical element and a position of the reflection type optical modulating device are set in a conjugate relationship.

DETAILED DESCRIPTION OF THE PREFERRED EMBODIMENTS

Figure 1:
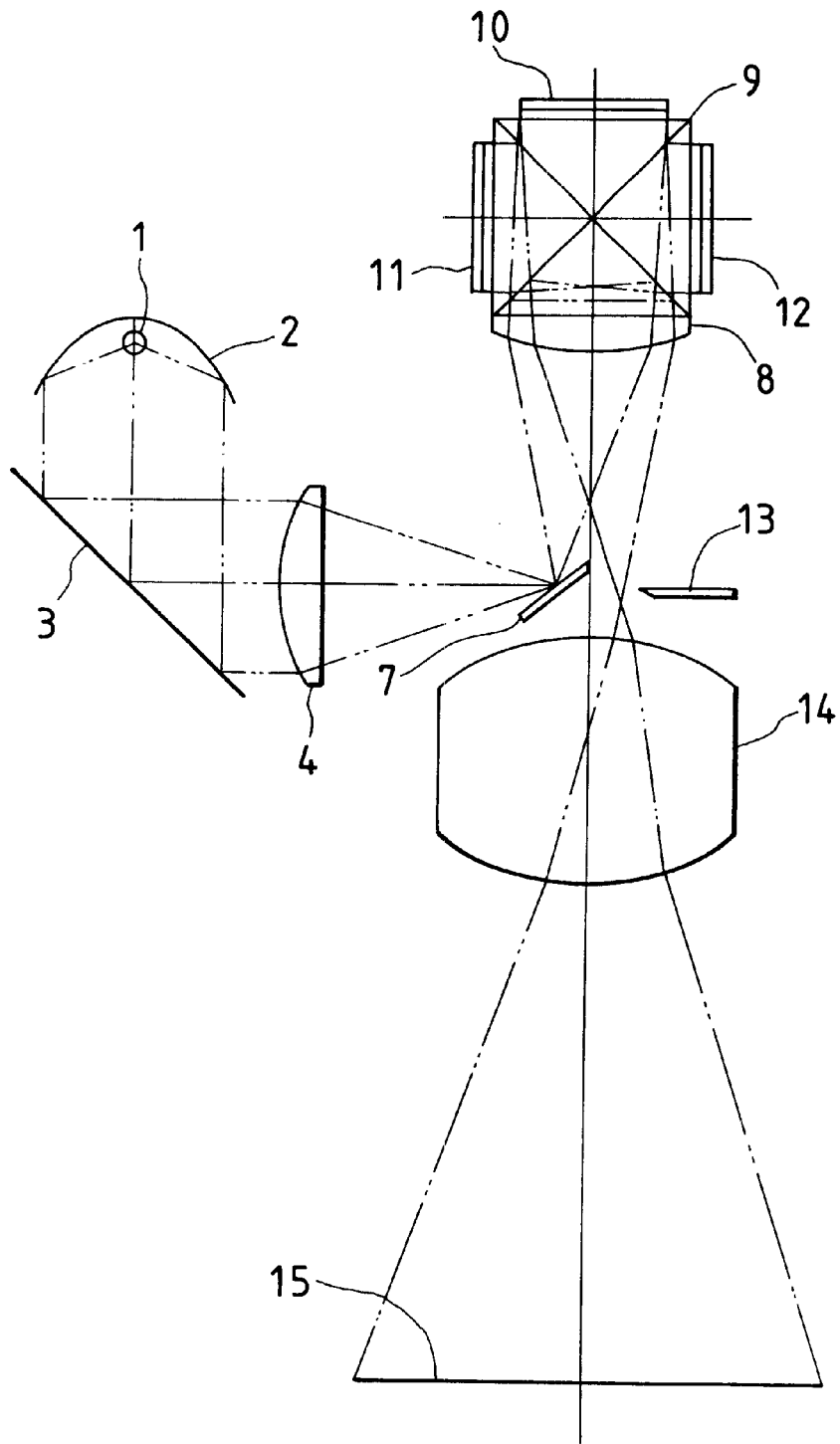
FIG. 1 is a view showing the prior art.
Figure 2:
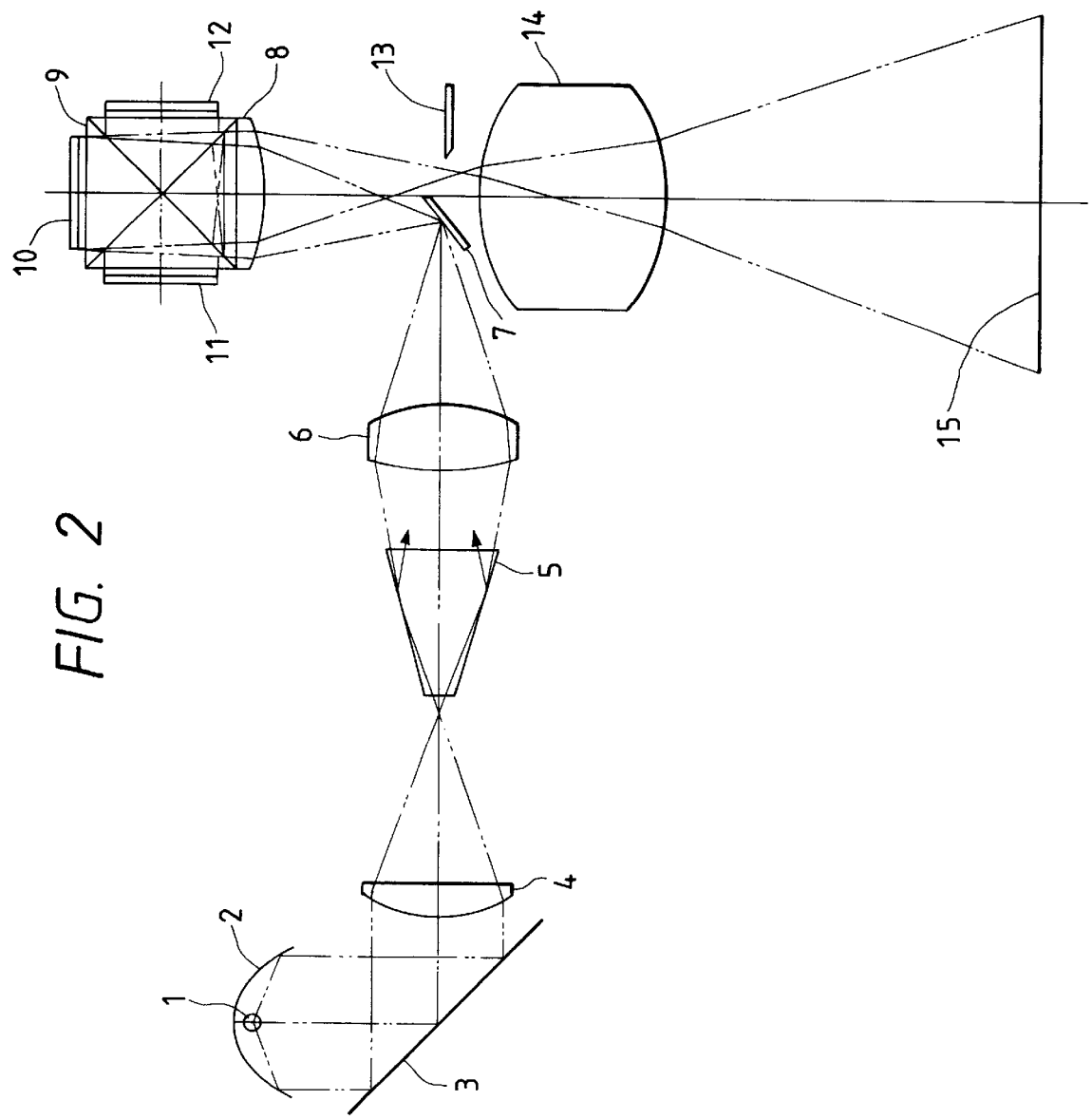
FIG. 2 is a schematic view showing a first embodiment of the present invention.

FIG. 2 is a schematic view showing a first embodiment of the present invention. Referring to FIG. 2, light beams outgone from a light source 1 such as a metal halide lamp and a xenon lamp are substantially collimated by a paraboloidal reflector 2. The substantially collimated light beams are reflected by a mirror 3 and thereafter a light source image is formed at a position of a front surface (a first end surface) of an integrator 5 via a condenser lens 4. Some light beams which have been incident on the integrator 5 penetrate the integrator, and a part of the remaining light beams is reflected by an internal reflecting surface once through several times and outgone from a rear end surface (a second end surface).

Figure 3:
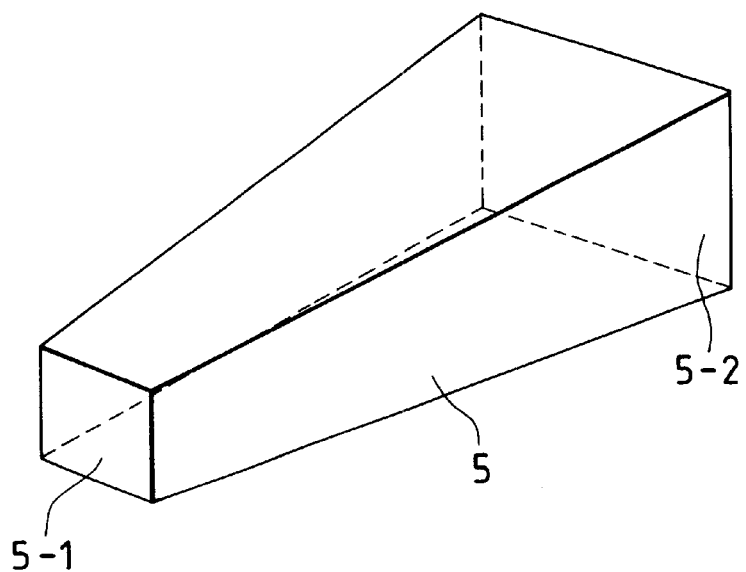
FIG. 3 is a view showing one example of an integrator.

FIG. 3 shows a configuration of a glass rod suitable for the integrator 5 in the first embodiment of the present invention. An external shape of the glass rod is a hexahedron in which an apex of a square cone is cut off in parallel to the bottom. The glass rod includes a front end surface 5-1 upon which the light beams are incident, and a rear end surface 5-2 from which the light beams are outgone. An areal size of the rear end surface 5-2 is larger than that of the front end surface 5-1. The two end surfaces 5-1, 5-2 are linked to each other by way of four side surfaces taking a tapered shape.

Referring to FIG. 3, the four side surfaces are each non-parallel to an optical axis and have a taper angle. For example, however, two of the four side surfaces may be surface parallel to the optical axis. The two end surfaces 5-1, 5-2 and the four side surfaces are each polished enough to provide an optical smoothness, and what is selected as the taper angle is an angle at which the light beams are totally reflected by the four side surfaces. Of the light beams incident on the glass rod, the light beams incident on the front end surface 5-1 in a state of being approximate to a vertical incidence are not totally reflected by the glass rod but penetrate this glass rod, and the light beams obliquely incident on the front end surface 5-1 are totally reflected once through several times by the four side surfaces inwardly of the glass rod and outgone from the rear end surface 5-2.

At this time, for the paraboloidal reflector 2 and the condenser lens 4, there may be preferably used those that satisfy a relationship such as $4 \leq F4/F3 \leq 10$ (where F3 is the distance from the bottom surface of the paraboloidal reflector to the focal point), where F3 is the focal length of the paraboloidal reflector 2, and F4 is the focal length of the condenser lens 4. That is why a smaller light source image can be formed in a position of the front end surface 5-1 of the integrator 5.

Figure 4:
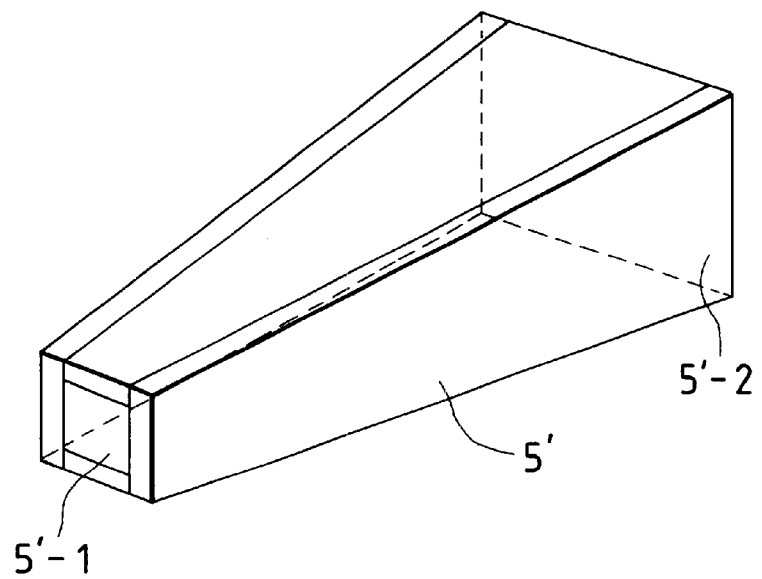
FIG. 4 is a view showing another example of the integrator.

FIG. 4 illustrates a configuration of a kaleidoscope suitable for the integrator 5' in the first embodiment of the present invention. An external shape of the kaleidoscope is, as in the case of the glass rod, a hexahedron in which the apex of the square cone is cut off in parallel to the bottom. The kaleidoscope includes a front end surface 5'-1 upon which the light beams are incident, and a rear end surface 5'-2 from which the light beams emerge, and two end surfaces are linked to the four side surfaces assuming a tapered shape.

Referring to FIG. 4, the four side surfaces are each non-parallel to the optical axis and have a taper angle. For instance, two of the four side surfaces may be surfaces parallel to the optical axis. The four side surfaces are each flat mirrors taking a trapezoidal shape, with mirror surfaces each directed inwardly, and are assembled so that respective sides are coincident with each other. An internal space through which the front end surface 5'-1 is linked to the rear end surface 5'-2 is hollow. Of the light beams incident on the kaleidoscope, the light beams incident on the front end surface 5'-1 in a state of being approximate to the vertical incidence are not reflected inwardly of the kaleidoscope but penetrate this kaleidoscope, and the light beams obliquely incident on the front end surface 5'-1 are reflected once through several times by the mirror surfaces of the four side surfaces of the kaleidoscope and outgone from the rear end surface 5'-2.

The integrator illustrated in FIGS. 3 and 4 is usable in other embodiments which will be described later on.

Referring back to FIG. 2, the light beams from the integrator 5 are incident upon a convex lens 6, and the convex lens 6 forms an image of the light source 1 in the vicinity of a reflecting mirror 7 with the incident light beams. The reflecting mirror 7 is disposed at a position of an aperture stop of a projection lens 14.

Figure 5:
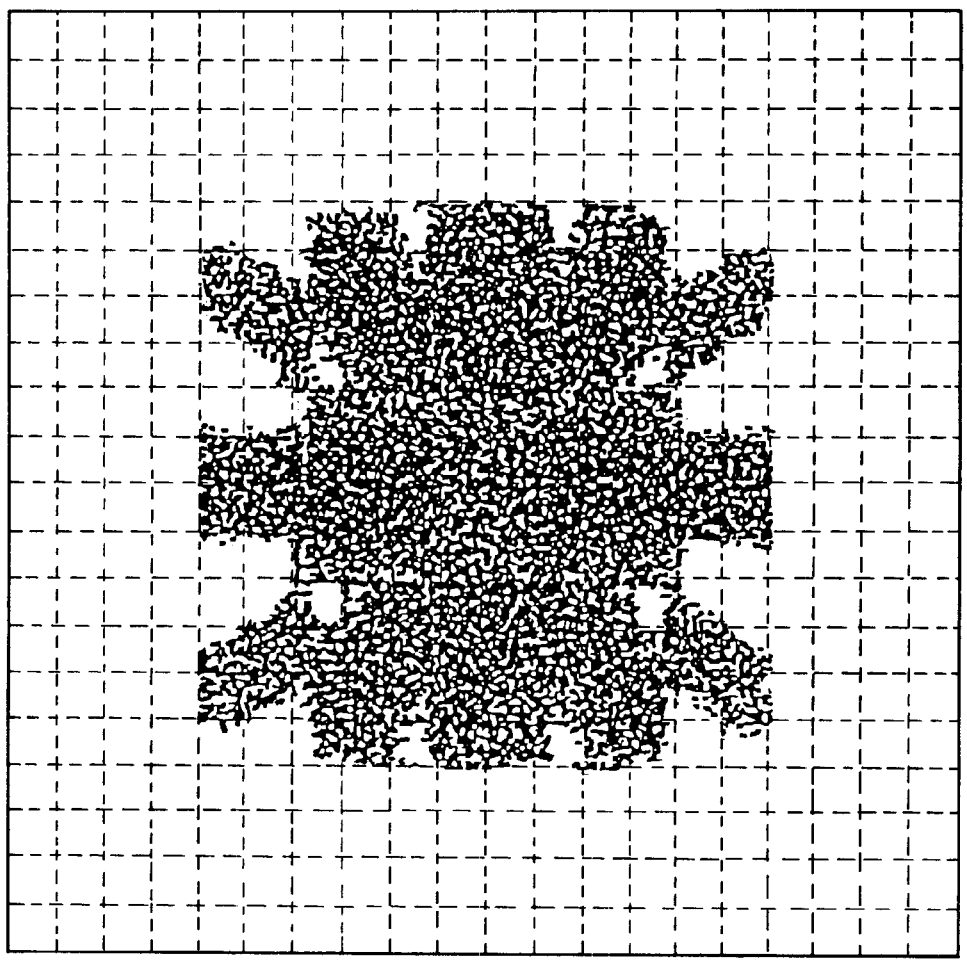
FIG. 5 is a spot diagram of a light source image obtained through the integrator.

FIG. 5 shows one example of a spot diagram of the light source image formed by the convex lens 6. The light source image is not reflected in inside of the integrator 5 but penetrate it or is reflected once to several times, and hence the spot diagram becomes an aggregation of a plurality of minute light source images as shown in FIG. 4. For instance, in the example in FIG. 5, a result of one reflection at the maximum appears in the lengthwise direction in FIG. 5, and a result of two reflections at the maximum appears in the crosswise direction in FIG. 5, wherein the light source image in (3×5) matrix is formed.

A size of the light source image is determined based on the number of reflections, which is therefore an important parameter in the present invention.

Referring again to FIG. 2, the light beams from the integrator 5 are reflected by the reflecting mirror 7 and incident upon a plano-convex lens 8. The light beams substantially collimated by the plano-convex lens 8 are incident upon a cross dichroic prism 9 and separated into (light beams assuming) three colors of R, G, B by this cross dichroic prism 9. The light beams in the three colors illuminate reflection type liquid crystal display panels 10, 11, 12 defined as optical modulation devices for corresponding colors (wavelength bands). The reflection type liquid crystal display panels 10, 11, 12 are liquid crystal panels using high polymer dispersion type liquid crystals, and form image information by executing optical modulations such as scattering or not scattering the incident light beams per pixel in accordance with image signals. Liquid crystal display panels in other embodiments which will hereinafter be described have the same construction and function, however, other types of liquid crystal display panels may also be used according to the necessity.

It is important for the optical system in this embodiment that image of the rear end surface 5-2 of the integrator 5 is formed on the liquid crystal display panels 10, 11, 12 through the convex lens 6 and the plano-convex lens 8. At the rear end surface 5-2 of the integrator 5, the light beams penetrating the integrator 5 without being reflected in inside of the integrator 5 and the light beams reflected once through several times, are overlapped with each other, and hence a substantially uniform light intensity distribution is obtained with no ununiformity in color of the light source and no ununiformity in luminance. Accordingly, if this rear end surface 5-2 is set in a conjugate relationship with the display surfaces of the liquid crystal display panels 10, 11, 12 through the convex lens 6 and the plano-convex lens 8, the color ununiformity and the luminance ununiformity on the display surfaces of the liquid crystal display panels 10, 11, 12 can be reduced. As a result, color ununiformity and luminance ununiformity of the image displayed on the screen 15 can be also reduced. Further, the rear end surface 5-2 of the integrator 5 takes a rectangular shape substantially similar to the display surface of each of the liquid crystal panels 10, 11, 12, and image of the rear end surface 5-2 of the integrator 5 is formed on the liquid crystal panels 10, 11, 12 at a proper magnification, thereby effectively illuminating the liquid crystal panels 10, 11, 12.

Note that FIG. 2 shows each of the lens 4, the lens 6 and the lens 8 as a single piece of lens, however, lens systems thereof may be each constructed of a plurality of lenses. The construction is the same with respective lenses in the embodiments which will be hereinafter be discussed. Accordingly, the "convex lens" in the present application implies a lens system having a positive refractive power.

The reflected light beams assuming the respective colors, which have been modulated corresponding to the image signals by the reflection type liquid crystal display panels 10, 11, 12, are again incident upon the cross dichroic prism 9 and color-synthesized therein. Thereafter, the light beams are converged by the plano-convex lens 8, and at least a part of the light beams travels through the aperture of the aperture stop 13 and it is projected via the projection lens 14 onto the screen 15. At this time, the light beams regularly reflected by the reflection type liquid crystal display panels 10, 11, 12 form a light source image similar to the light source image illustrated in FIG. 5 at the aperture of the aperture stop 13. It is because the light source 1, the front end surface 5-1 of the integrator 5, the reflecting mirror 7 and the aperture stop 13 are in positions conjugate to each other. The optical system consisting of the projection lens 14 and the condenser lens 8 is a system in which the liquid crystal display panel side is telecentric.

Image of the front incidence surface 5-1 of the integrator 5 is formed in reduction at the aperture of the aperture stop 13 through the convex lens 6 and the plano-convex lens 8 (passing therethrough twice in reciprocation). On this occasion, the magnification (the reduction) is a vital parameter for determining a contrast of the display image in the optical system in this embodiment. That is why it is vital that if the small light source image can be formed, and even if the aperture of the aperture stop 13 is small, it is feasible to transmit a greater quantity of light when displayed at a white level and transmit only a very slight quantity of scattered light when displayed at a black level.

The optical system in this embodiment will be explained in greater detail with reference to FIG. 6.

Figure 6:
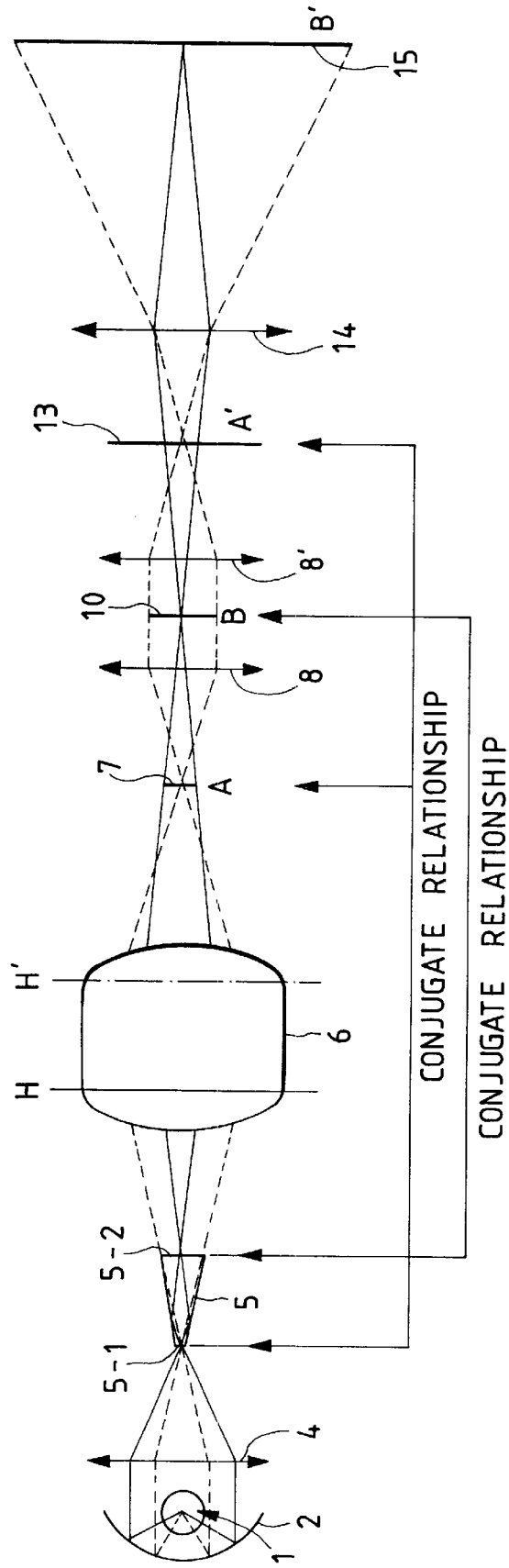
FIG. 6 is an explanatory view of an optical system in the first embodiment of the present invention.

FIG. 6 shows, for an easier comprehension, a transmitting system into which the optical system in FIG. 2 is converted. FIG. 6 also shows an embodiment in which a transmission type liquid crystal display panel is used instead of the reflection type liquid crystal display panel.

Referring to FIG. 6, the light beams from the light source 1 are substantially collimated by the paraboloidal reflector 2 and, after being reflected by an unillustrated mirror, an image of the light source is formed in the front end surface position 5-1 of the integrator 5 through the condenser lens 4. A part of light beams incident on the integrator 5 is not reflected but penetrate inside the integrator 5, and the remaining light beams are reflected in the inside once to several times and outgone from the rear end surface 5-2.

The light beams from the integrator 5 are incident on the convex lens 6, and the convex lens 6, with these light-beams, forms a light source image A in the vicinity of the unillustrated reflecting mirror 7 disposed in a position of the aperture stop 13 of the projection lens 14 in the case of the reflection type. The light beams reflected by the reflecting mirror 7 travel through the unshown cross dichroic prism as well as through the plano-convex lens 8, and illuminate the unshown liquid crystal display panel. Image of the rear end surface 5-2 of the integrator 5 is formed as an image B on the liquid crystal display panel through the convex lens 6 and the plano-convex lens 8 as described above.

In the case of the reflection type liquid crystal display panel, a development is shown, and a plano-convex lens 8' is the same as the plano-convex lens 8. In the case of the transmitting type liquid crystal display panel, the plano-convex lens 8 is disposed in front of the panel (a light incidence side), and the plano-convex lens 8' is disposed in rear thereof (a light outgoing side). Of the light beams modulated corresponding to the image signals from the liquid crystal display panel, the light beams, which are not scattered by the liquid crystal and reflected or penetrate, are converged by the plano-convex lens 8' and form a light source image A'. Thereafter, the same light beams pass through the aperture of the aperture stop 13 and they are projected in the form of an image B' on the screen 19 through a projection lens 18.

In this optical system, as shown in FIG. 6, the positions in which the light source 1, the front end surface 5-1 of the integrator 5 and the reflecting mirror 7 (a light source image A) are disposed, and the position (a light source image A') 13 of the aperture stop of the projection lens 14, bear the conjugate relationship. On this occasion, the light source image A is preferably an image into which image of the light beams from the front end surface 5-1 of the integrator 5 is formed in reduction (a lateral magnification $\beta 1$). This is intended to facilitate a disposition of the reflecting mirror 7. Further, the light source image A' is also preferably an image into which the light source image A is formed in reduction (a lateral magnification $\beta 2$). That is why the dimension of the light source image A', as explained above, determines the contrast of the display image, and hence the contrast is determined by the image-forming magnification when the light source image A' is formed.

Accordingly, preferably, the light source image A' should be an image into which image of the light beams from the front end surface 5-1 of the integrator 5 is formed in reduction (a lateral magnification $\beta 3$). Since $\beta 3 = \beta 2 \cdot \oplus 1$, the following formulae may be established with respect to a long side direction and a short side direction:

$$D1 \leq \beta 3 \cdot (2n1+1) \cdot L1 \leq 2.5\, D1 \qquad [11]$$

$$D2 \leq \beta 3 \cdot (2n2+1) \cdot L2 \leq 2.5\, D2 \qquad [12]$$

where L1 and L2 are the dimensions of the front end surface 5-1 of the integrator in the liquid crystal display panel long side direction and in the short side direction, n1 is the maximum number of reflections by the integrator 5 in the long side direction, n2 is the maximum number of reflections in the short side direction, D1 is the length of the aperture (a diameter) of the aperture stop in the liquid crystal display panel long side direction with respect to the light beam in each color (a wavelength band), and D2 is the length thereof in the liquid crystal display panel short side direction.

In the above formulae, $(2n1+1) \cdot L1$ represents a size of the light source image (consisting of a real image and a virtual image) formed on a plane including the front end surface 5-1 of the integrator 5. If the maximum number of reflections is $n1=2$, the light source image has a size by five times as large as L1, and a value obtained by multiplying it by the lateral magnification $\beta 3$ of the optical system indicates a size of the light source image A'. When this value is set equal to the length D1 of the aperture (the diameter) of the aperture stop 13 in the long side direction of the integrator 5 with respect to the light beam of each color (the wavelength band), the maximum contrast and the maximum brightness are to be obtained. Further, if this value is smaller than a 2.5-fold value of D1, it was confirmed through tests that a decrease quantity of the contrast may be as comparatively small as approximately 80% or above of the maximum case. This is the same in the short side direction of the integrator 5.

Further, in this optical system, as shown in FIG. 6, there exists a conjugate relationship between the rear end surface 5-2 of the integrator 5, the liquid crystal display panel surface (the image B) and the screen (the light source image B'). The distance d3 is given by:

$$d3 = [f' \cdot d2 - f' \cdot d1 \cdot f/(d1-f)]/[d2 - f' - d1 \cdot f/(d1-f)] \qquad [13]$$

where d1 is the optical distance from the rear end surface 5-2 of the integrator 5 to the front side principal plane H of the convex lens 6, d2 is the optical distance from the rear side principal plane H' of the convex lens 6 to the convex lens 8 (to the front side principal plane of the lens, and, in the case of the plano-convex lens, it corresponds to a vertex of the convex surface), d3 is the distance from the convex lens 8 (from the rear side principal plane of the lens 8, and, in the case of the plano-convex lens, it implies that lens back+lens thickness/lens refractive index) to the liquid crystal display panel surface, f is the focal length of the convex lens 6, and f' is the focal length of the convex lens 8.

Further, a lateral magnification $\beta 4$ of a system consisting of the convex lens 6 and the convex lens 8 is given such as:

$$\beta 4 = f \cdot d3/[d2 \cdot (d1-f) - d1 \cdot f] \qquad [14]$$

The following relationships are also established:

$$l1 < \beta 4 \cdot L3, \text{ and } l2 < \beta 4 \cdot L4 \qquad [15]$$

where L3, L4 are respectively the dimensions (lengths) of the rear end surface 5-2 of the integrator 5 in the liquid crystal display panel long side direction and in the liquid crystal display panel short side direction, and l1, l2 are the lengths of the long side and the short side of the liquid crystal display panel. In particular, it is desirable that the lateral magnification $\beta 4$ be over 1 but under 1.2.

What is characterized herein is that the front end surface and the rear end surface of the present integrator 5 take such an end surface configuration as to establish the formulae [11]–[15], and are disposed in such positions as to establish the above conjugate relationship.

The optical system according to the present invention has the construction by which the contrast and the brightness of the image on the screen, and the illumination range can be simultaneously set in a preferable state by applying the integrator to the Schlieren optical system. More specifically, the light source image formed on the front end surface of the integrator is formed in the position of the aperture stop of the projection lens with such a size as to be expressed by:

Long Side*Short Side=$\{\beta 3 \cdot (2n1+1) \cdot L1\} * \{\beta 3 \cdot (2n2+1) \cdot L2\}$ The light beams from the rear end surface of the integrator illuminate the surface of the liquid crystal display panel with such a size as to be expressed by:

Long Side*Short Side=$\{\beta 4 \cdot L3\} * \{\beta 4 \cdot L4\}$

Note that $\beta 3$, $\beta 4$, n1, n2, L1, L2, L3, L4 connote as stated above, and "*" indicates the multiplication "×".

In order to secure the brightness on the screen, it is desirable that the L1*L2 be set to much the same size (an areal size) as the light source image formed by the paraboloidal reflector and the condenser lens or an ellipsoidal reflector. As explained above, the light source image is required to be diminished to enhance the contrast of the display image, and, for example, as in the embodiment discussed above, when the paraboloidal reflector is employed as the reflector, a preferable image forming optical system may be the one in which a ratio of F4/F3 of the focal length F4 of the condenser lens to the focal length F3 of the paraboloidal reflector is comparatively small as approximately 4 to 10. On the other hand, such as other embodiments which will be described later on, when the ellipsoidal reflector is used as the reflector, a preferable reflector may be the one in which a ratio F2/F1 of the second focal length F2 to the first focal length F1 thereof is as comparatively small as approximately 4 to 10.

Further, the numbers-of-reflections n1, n2 of the light beams within the integrator with respect to the directions orthogonal to each other, are also vital parameters for determining the size of the light source image A' at the aperture stop of the projection lens. Generally, it is possible to illuminate the liquid crystal display panel in which the light intensity distribution is more uniform as the number of reflections becomes larger. In the Schlieren optical system, however, there must be an optimum value (a range) in the number of reflections in terms of a restriction of the size of the light source image A'. The optimum value is selected so as to satisfy the above formulae [11], [12] (or formulae [21], [22], or formulae [31], [32] which are all explained later on). Normally, the maximum number of reflections is set such as n1=1 to 4 times, and n2=1 to 4 times. The maximum number of reflections is determined by an incidence angle of the light beams incident upon the integrator, a taper angle of the reflecting surface of the integrator (or a magnitude of L1*L2 or L3*L4), and a length of the integrator (the integrator length in the optical-axis direction). The integrator length is determined to meet the conjugate relationships shown in FIGS. 6, 7, 8 and 11, etc. Further, in order to restrict the maximum number of reflections, there is selected such a taper angle as to reduce an inclined angle of the incidence light beam from the reflector with respect to the optical axis due to the reflection. Accordingly, it follows that the configuration of the end surface of the present integrator has not a simple rod structure as expressed by L1=L3, and L2=L4 as disclosed in Japanese Patent Application Laid-Open No. 7-98479 but a structure as expressed by L1≠L3, and/or L2≠L4 as shown in FIGS. 3 and 4. In the Schlieren optical system, it is required that the light source image formed by the ellipsoidal reflector or the paraboloidal reflector and the condenser lens be selected as the one smaller than the length l1 of the long side and the length l2 of the short side of the liquid crystal display panel for the enhancement of the contrast, that the taper angle be the above angle. Therefore, the configuration of the end surface of the present integrator is desirably the one as expressed by L1<L3 and/or L2<L4, and particularly by L1<L3 and L2<L4.

Note that the configuration may be L1=L2 (square), and L1≠L2 (rectangle).

In the present optical system, the integrator as defined by L1<L3 or L2<L4, alternatively L1<L3 and L2<L4, is used in combination with the above-mentioned paraboloidal reflector and the convex lens, or the ellipsoidal reflector which will be mentioned later on, thereby enhancing the contrast on the screen by restraining small the size of the light source image A' in the position of the aperture stop of the projection lens. At the same time, there is no possibility of causing declines of the uniformity and the brightness on the screen. If L1=L3 and L2=L4 as in the conventional art, a value of L3*L4 might need a considerable magnitude in order to secure the illumination area of the liquid crystal display panel, and hence L1 and L2 inevitably increase. Then, if a considerable number of reflections within the integrator is taken to obtain the uniform illumination, the light source image A' in the position of the aperture of the aperture stop of the projection lens becomes large, with the result that the brightness and the contrast on the screen are not compatible. Further, if the number of reflections within the integrator is limited to the considerable number or under to make the contrast and the brightness compatible, no uniform illumination is obtained.

Moreover, the optical system for forming the image of the light beams from the front end surface of the integrator in the position of the aperture stop of the projection lens, shares a large proportion of elements with the optical system for forming the image of the light beams from the rear end surface of the integrator in the position of the liquid crystal display panel. Therefore, an expensive and complicated optical system is required for giving a large difference between the lateral magnification β3 (desirably a reduction system) and β4 (desirably an enlargement system). According to the construction of the present invention, L1<L3 or L2<L4, alternatively L1<L3 and L2<L4, so that the relationship between the lateral magnifications β3 and β4 is redundant, and the simple and inexpensive optical system can be used.

The integrator configuration as expressed by L1<L3 or L2<L4, alternatively L1<L3 and L2<L4 which is characteristic of the present optical system, the integrator being applied to the Schlieren optical system, may be a construction suitable for obtaining the bright high-contrast projection image with decreased quantities of luminance ununiformity and of color ununiformity on the screen.

Another embodiment of the present invention will be explained with reference to FIG. 6.

Figure 7:
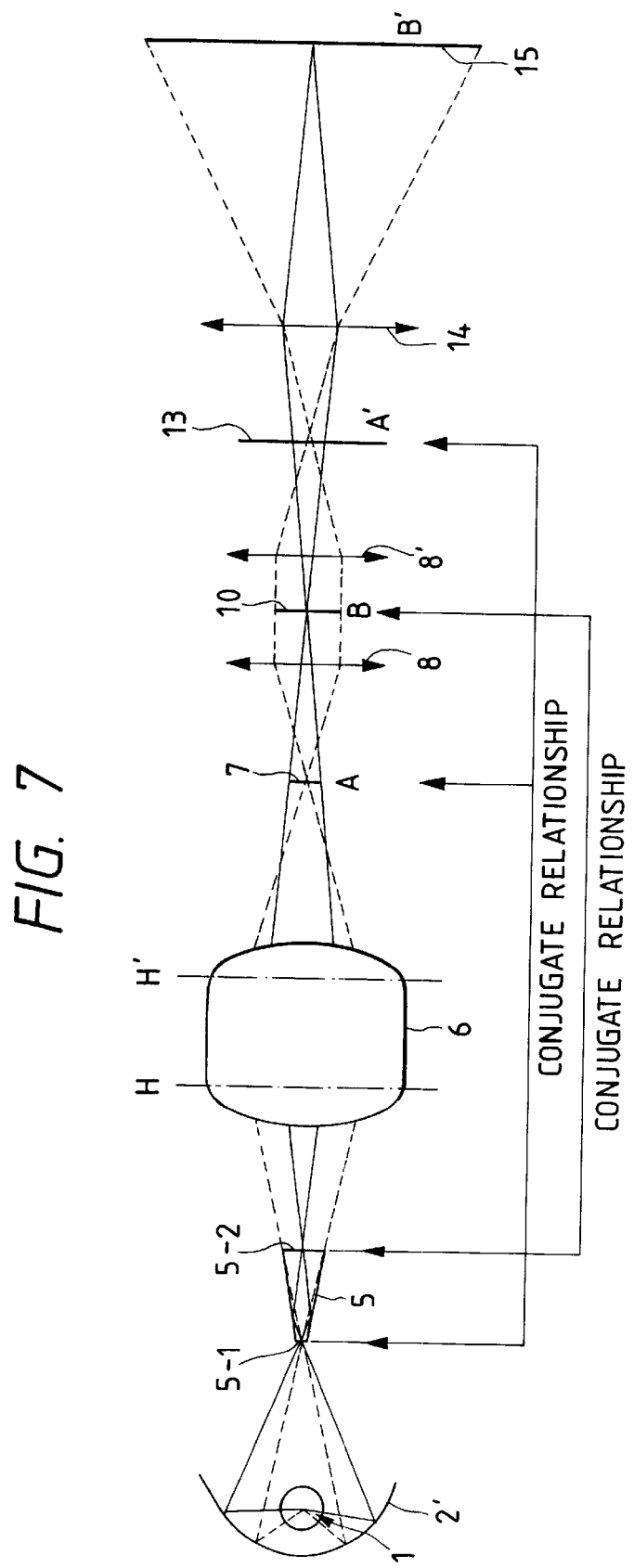
FIG. 7 is an explanatory view showing an optical system in a second embodiment of the present invention.

FIG. 7 also shows, such as FIG. 6, for an easier comprehension, a transmitting system into which the optical system using the reflection type display panel is converted. FIG. 7 also shows an embodiment in which a transmitting type liquid crystal display panel is used instead of the reflection type liquid crystal display panel.

Referring to FIG. 7, the light source 1 is disposed at a first focal point of an ellipsoidal reflector 2' (an elliptical mirror), and the light beams from the light source 1 are reflected by the ellipsoidal reflector 2' and an image of the light source 1 is formed in a position (a position of a second focal point of the ellipsoidal reflector 2') of the front end surface 5-1 of the integrator 5. A part of the light beams incident upon the integrator 5, is not reflected within the integrator 5 but pass therethrough, and the remaining light beams are reflected once to several times in the inside and outgone from the rear end surface 5-2. At this time, the preferable ellipsoidal reflector 2' may be the one in which a ratio F2/F1 of the second focal length F2 (the light source image—the bottom surface of the reflector) to the first focal length F1 (the light source—the bottom surface of the reflector) is as comparatively small as 4 through 10. That is why a small light source image can be formed in the front end surface position 5-1 of the integrator 5.

The light beams from the integrator 5 are incident on the convex lens 6. The convex lens 6 forms the light source image A in the vicinity of the unillustrated reflecting mirror 7 disposed in the position of the aperture stop 13 of the projection lens 14 in the case of the reflection type with those incident light beams. The light beams reflected by the reflecting mirror 7 pass through the plano-convex lens 8 and the unillustrated cross dichroic prism, and illuminate the unillustrated liquid crystal display panel. Image of the rear end surface 5-2 of the integrator 5 is formed as an image B on the liquid crystal display panel surface through the convex lens 6 and the plano-convex lens 9 as described above.

In the case of the reflection type liquid crystal display panel, a development is shown, and a plano-convex lens 8' is the same as the plano-convex lens 8. In the case of the transmitting type liquid crystal display panel, the plano-convex lens 8 is disposed in front of the panel (a light incidence side), and the plano-convex lens 8' is disposed in rear thereof (a light emerging side). Of the light beams modulated corresponding to the image signals from the liquid crystal display panel, the light beams, which are not scattered by the liquid crystal and reflected or penetrate, are converged by the plano-convex lens 8' and form a light source image A'. Thereafter, the same light beams pass through the aperture of the aperture stop 13 and are projected as an image B' on the screen 19 through the projection lens 18.

In this optical system, as illustrated in FIG. 7, the positions in which the light source 1, the front end surface 5-1 of the integrator 5 and the reflecting mirror 7 (the light source image A) are disposed, and the position (the light source image A') 13 of the aperture stop of the projection lens 14, bear the conjugate relationship. On this occasion, the light source image A is preferably an image wherein image of the light beams from the front end surface 5-1 of the integrator 5 is formed in reduction (the lateral magnification β1). This is intended to facilitates disposition of the reflecting mirror 7. Further, the light source image A' is also preferably an image into which the light source image A is formed in reduction (the lateral magnification β2). That is why the dimension of the light source image A', as explained above, determines the contrast of the display image, and hence the contrast is determined by the image-forming magnification when forming the light source image A'.

Accordingly, preferably, the light source image A' should be an image into which image of the light beams from the front end surface 5-1 of the integrator 5 is formed in reduction (the lateral magnification β3). Since β3=β2·β1, the following formulae may be established with respect to the long side direction and the short side direction:

$$D1 \leq \beta 3 \cdot (2n1+1) \cdot L1 \leq 2.5\ D1 \quad [21]$$

$$D2 \leq \beta 3 \cdot (2n2+1) \cdot L2 \leq 2.5\ D2 \quad [22]$$

where L1 and L2 are the dimensions of the front end surface 5-1 of the integrator in the liquid crystal display panel long side direction and in the short side direction, n1 is the maximum number of reflections by the integrator 5 in the long side direction, n2 is the maximum number of reflections in the short side direction, D1 is the length of the aperture (a diameter) of the aperture stop in the liquid crystal display panel long side direction with respect to the light flux in each color (a wavelength band), and D2 is the length thereof in the liquid crystal display panel short side direction.

In the above formulae, (2n1+1)·L1 represents a size of the light source image (consisting of a real image and a virtual image) formed on a plane including the front end surface 5-1 of the integrator 5. If the maximum number of reflections is n1=2, the light source image has a size by five times as large as L1, and a value obtained by multiplying it by the lateral magnification β3 of the optical system indicates a size of the light source image A'. When this value is set equal to the length D1 of the aperture (the diameter) of the aperture stop 13 in the long side direction of the integrator 5 with respect to the light flux of each color (the wavelength band), the maximum contrast and the maximum brightness are to be obtained. Further, if this value is smaller than a 2.5-fold value of D1, it was confirmed through tests that a decrease quantity of the contrast may be as comparatively small as approximately 80% or above of the maximum case. This is the same in the short side direction thereof.

Further, in this optical system, as shown in FIG. 7, there exists a conjugate relationship between the rear end surface 5-2 of the integrator 5, the liquid crystal display panel surface (the image B) and the screen (the light source image B'). The distance d3 is given by:

$$d3=[f'\cdot d2-f'\cdot d1 \cdot f/(d1-f)]/[d2-f'-d1 \cdot f/(d1-f)] \quad [23]$$

where d1 is the optical distance from the rear end surface 5-2 of the integrator 5 to the front side principal plane H of the convex lens 6, d2 is the optical distance from the rear side principal plane H' of the convex lens 6 to the convex lens 8 (to the front side principal plane of the lens, and, in the case of the plano-convex lens, it corresponds to a vertex of the convex surface), d3 is the distance from the convex lens 8 (from the rear side principal plane of the lens 8, and, in the case of the plano-convex lens, it implies that lens back+lens thickness/lens refractive index) to the liquid crystal display panel surface, f is the focal length of the convex lens 6, and f' is the focal length of the convex lens 8.

Further, a lateral magnification β4 of a system consisting of the convex lens 6 and the convex lens 8 is given such as:

$$\beta 4=f\cdot d3/[d2\cdot(d1-f)-d1\cdot f] \quad [24]$$

The following relationships are also established:

$$l1<\beta 4 \cdot L3,\ \text{and}\ l2<\beta 4 \cdot L4 \quad [25]$$

where L3, L4 are respectively the lengths of the rear end surface 5-2 of the integrator 5 in the liquid crystal display panel long side direction and in the liquid crystal display panel short side direction, and l1, l2 are the lengths of the long side and the short side of the liquid crystal display panel. In particular, it is desirable that the lateral magnification β4 be over 1 but under 1.2.

What is characterized herein is that the front end surface and the rear end surface of the present integrator 5 take such an end surface configuration as to establish the formulae [21]–[25], and are disposed in such positions as to establish the above conjugate relationship.

Still another embodiment of the present invention will be explained with reference to FIG. 8.

Figure 8:
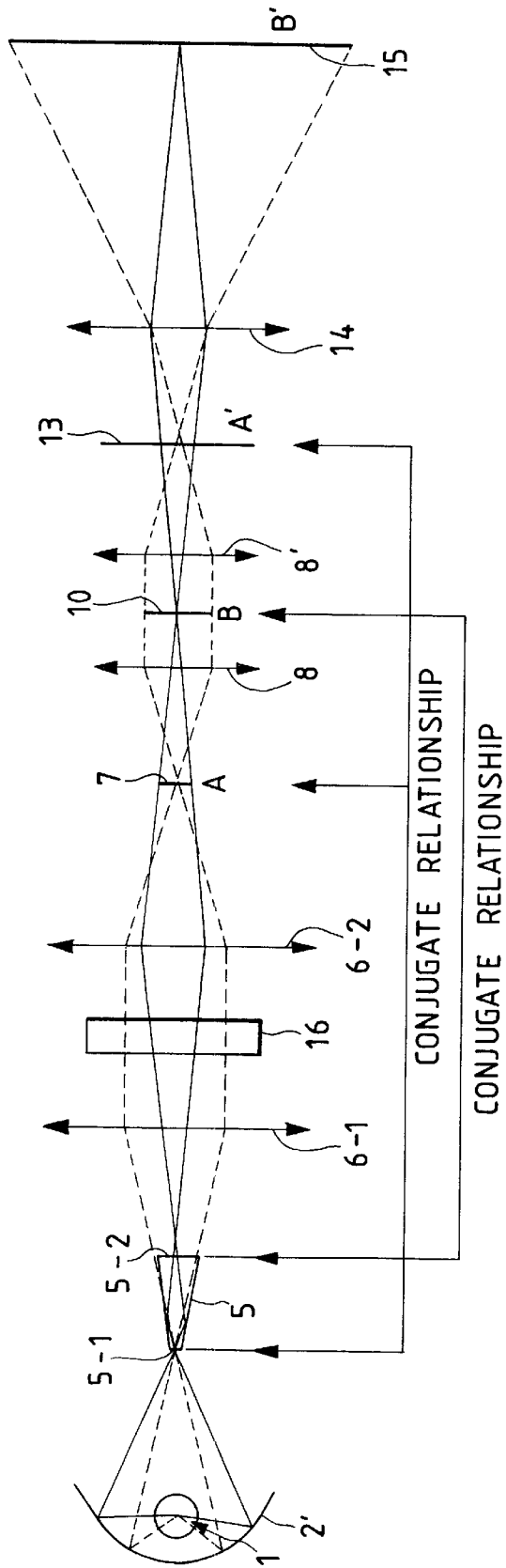
FIG. 8 is an explanatory view showing an optical system in a third embodiment of the present invention.

FIG. 8 also shows, as in FIG. 7, for an easier comprehension, a transmitting system into which the optical system using the reflection type display panel is converted. FIG. 8 also shows an embodiment in which a transmitting type liquid crystal display panel is used.

In this embodiment, the convex lens 6 is so disposed as to be separated into convex lenses 6-1 and 6-2 between which a color separation optical element 16 is interposed. Other configurations are the same as those in FIG. 7.

Referring to FIG. 8, the light source 1 is disposed at the first focal point of the ellipsoidal reflector 2' (the elliptical mirror), and the light beams from the light source 1 are reflected by the ellipsoidal reflector 2' and form an image of the light source 1 in the position (the position of the second focal point of the ellipsoidal reflector 2') of the front end surface 5-1 of the integrator 5. A part of the light beams incident upon the integrator 5 is not reflected within the integrator 5 but passes therethrough, and the remaining light beams are reflected once to several times inwardly and outgone from the rear end surface 5-2. At this time, the preferable ellipsoidal reflector 2' may be the one in which a ratio F2/F1 of the second focal length F2 (the light source image—the bottom surface of the reflector) to the first focal length F1 (the light source—the bottom surface of the reflector) is as comparatively small as 4 to 10. That is why a small light source image can be formed in the front end surface position 5-1 of the integrator 5.

The light beams from the integrator 5 are sequentially incident on the convex lenses 6-1, 6-2. The convex lenses 6-1, 6-2 form the light source image A in the vicinity of the unillustrated reflecting mirror 7 disposed in the position of the aperture stop 13 of the projection lens 14 in the case of the reflection type with those incident light beams. The position of the front end surface 5-1 of the integrator 5 is coincident with the position of the front side focal point of the convex lens 6-1. The light beams from the integrator 5 are substantially collimated by the convex lens 6-1 and incident upon the color separation element 16. The color separation element 16 functions to separate the white color light from the light source 1 into respective colors (wavelength bands) R, G, B.

Figure 9:
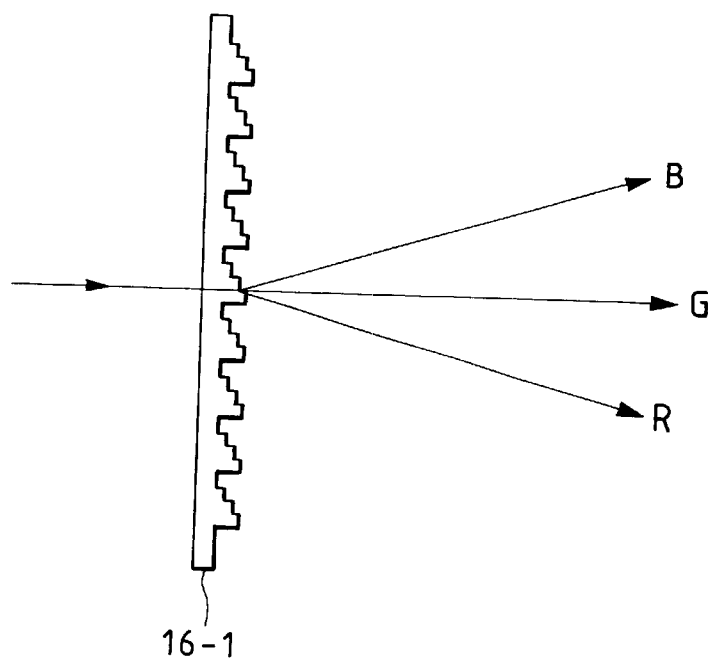
FIG. 9 is a view illustrating a first example of a color separating element suitable for the third embodiment.

FIG. 9 shows a transmission type diffraction grating 16-1 by way of one example of the color separating element 16. The transmitting type diffraction grating 16-1 is classified as a stairs type color separation diffraction grating disclosed in Japanese Patent Publication No. 61-45210, wherein the element transmits and separates the white color light incident on this element into 0th- and ±1st-order diffraction light beams. The transmitting diffraction light beams of these three orders correspond to the respective colors R, G, B (the wavelength bands).

Figure 10:
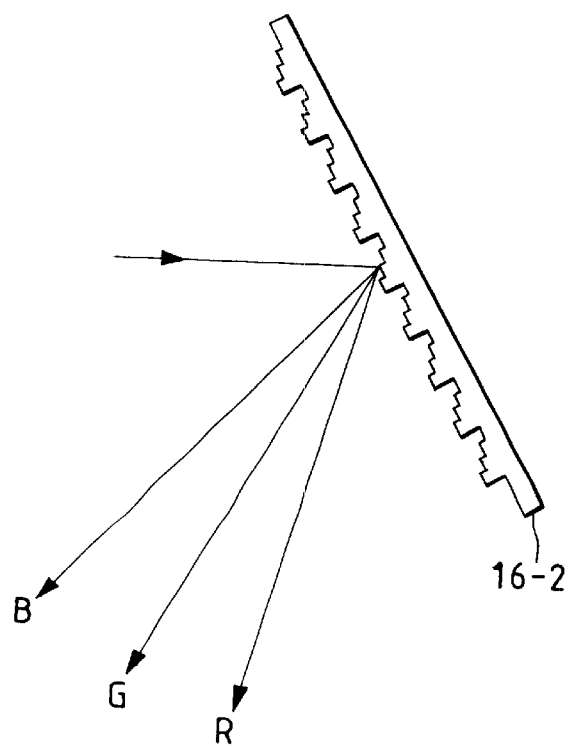
FIG. 10 is a view showing a second example of the color separating element suitable for the third embodiment.

FIG. 10 shows a reflection type diffraction grating 16-2 by way of another example of the color separation element 16. The reflection type diffraction grating 16-2 is classified as a stairs type color separation diffraction grating disclosed in Japanese Patent Application Laid-Open No. 3-181269, wherein the element reflects and separates the white color light incident on this element into 0th- and ±1st-order diffraction light beams. The reflected diffraction light beams of these three orders correspond to the respective colors R, G, B (the wavelength bands). The reflection type diffraction grating 16-2 is, though an optical path is deflected upon a reflection, as shown in FIG. 7, illustrated as the one converted into the transmitting system by developing the optical path for the reflection.

Figure 11:
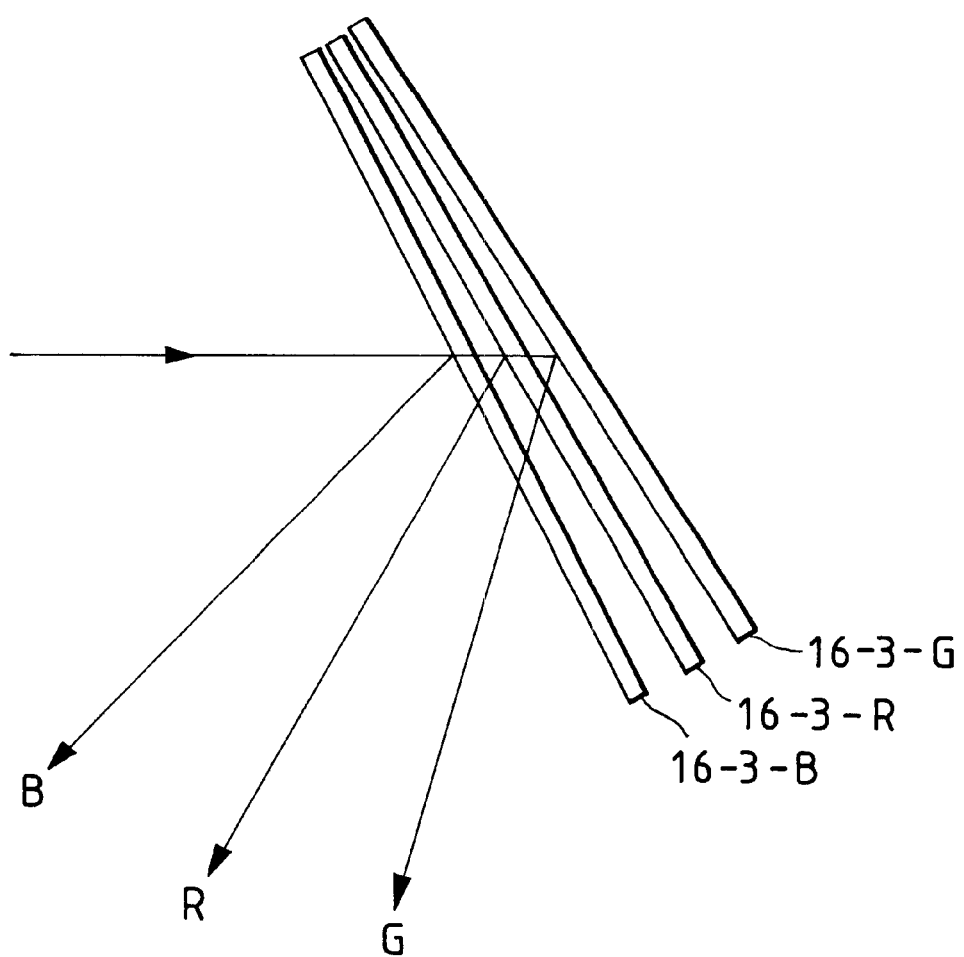
FIG. 11 is a view showing a third example of the color separating element suitable for the third embodiment.

FIG. 11 illustrates a system constructed of three pieces of dichroic mirrors 16-3B, 16-3R, 16-3G by way of still another color separation element. The dichroic mirror 16-3B exhibits such a spectral characteristic as to reflect the light beams in a blue wavelength band B and transmits the light beams in green and red wavelength bands. The dichroic mirror 16-3R exhibits such a spectral characteristic as to reflect the light beams in a red wavelength band R and transmits the light beams in a green wavelength band G. The dichroic mirror 16-3G has such a spectral characteristic as to reflect the light beams in the green wavelength band G. An ordinary mirror can be used in place of the dichroic mirror 16-3G.

The dichroic mirrors 16-3B, 16-3R, 16-3G are disposed with inclinations to each other, and hence the reflected light beams from the respective mirrors are separated into the light beams in the respective wavelength bands R, G, B. The dichroic mirrors 16-3B, 16-3R, 16-3G are, though the optical paths are deflected upon reflections, as shown In FIG. 7, illustrated as those converted into the transmitting system by developing the optical paths for reflections.

The color separation diffraction gratings in FIGS. 9 and 10, and the dichroic mirror system in FIG. 11 have a spectral characteristic with a large dependency on the incident angle of the light beams. Therefore, the light beam incident angle dependency of the spectral characteristic of those color separating elements might cause the color ununiformity and the luminance ununiformity when illuminating the liquid crystal display panel. Such being the case, in accordance with this embodiment, the light beams from the integrator 5 are substantially collimated and incident on the color separating element 16 by making the position of the front end surface 5-1 of the integrator 5 coincident with the position of the front side focal point of the convex lens 6-1.

Referring back to FIG. 8, the light beams in the wavelength bands R, G, B from the color separating element 16, are incident on the convex lens 6-2, and the convex lens 6-2 forms the image A of the light source in the vicinity of the reflecting mirror 7 disposed in the position of the aperture stop 13 of the projection lens 14 in the case of the reflection type with these light beams. Hereinafter, for simplicity, the optical system will be explained by putting an emphasis on one light beam among the light beams in the wavelength bands R, G, B. For example, the light beam G defined as the 0th-order diffracted light beams in the case of using the color separating element 16-1, illuminate a liquid crystal panel 10 via the plano-convex lens 8.

Image of the rear end surface 5-2 of the integrator 5 is formed as the image B on the liquid crystal display panel 10 through the convex lenses 6-1, 6-2 and the plano-convex lens 8 as described above. Of the light beams modulated corresponding to the image signals in the liquid crystal display panel 10, the reflected or transmitted light beams, which are not scattered by the liquid crystal are converged by the plano-convex lens 81 and the light source image A' is formed. Thereafter travel through the aperture of the aperture stop 13 and are projected as the image B' on the screen 15 via the projection lens 14.

In this optical system, as illustrated in FIG. 8, the position of the light source 1, the position of the front end surface 5-1 of the integrator 5, the position of the reflecting mirror 7 (the position of the light source image A), and the position of the aperture stop 13 (the position of the light source image A') of the projection lens 14, bear the conjugate relationship.

In the present optical system, the light source image A is preferably an image into which the front end surface 5-1 of the integrator 5 is formed in reduction (the lateral magnification $\beta1$). This is intended to facilitates a disposition of the reflecting mirror 7. Further, the light source image A' is also preferably an image into which the light source image A is formed in reduction (the lateral magnification $\beta2$). That is why, as explained above, the contrast of the display image is determined based on the size of the light source image A', and hence the contrast is determined by the image-forming magnification when forming the light source image A'.

Accordingly, preferably, the light source image A' should be an image into which image of the front end surface 5-1 of the integrator 5 is formed in reduction (the lateral magnification $\beta3$). Since $\beta1=f2/f1$, and $\beta3=\beta2\cdot\beta1$, the same relationships as those of the conditions [21], [22] in the embodiment shown in FIG. 6 may be established with respect to the respective side directions on the assumption that f1 is the focal length of the convex lens 6-1, f2 is the focal length of the convex lens 6-2, L1 and L2 are the lengths of the front end surface 5-1 of the integrator in the liquid crystal display panel long side direction and in the short side direction, n1 is the maximum number of reflections by the integrator 5 in the liquid crystal display panel long side direction, n2 is the maximum number of reflections in the liquid crystal display panel short side direction, D1 is the length of the aperture (a diameter) of the aperture stop in the liquid crystal display panel long side direction with respect to the light beam in each wavelength band, and D2 is the length thereof in the liquid crystal display panel short side direction.

Further, in the present optical system, as shown in FIG. 8, the rear end surface 5-2 of the integrator 5, the liquid crystal display panel surface (the image B) and the screen (the light source image B') are in the conjugate relationship. A synthetic system of the convex lenses 6-1, 6-2 is considered in order to apply, to this embodiment, the conditional formula [23] in the embodiment shown in FIG. 6. For simplicity, the convex lenses 6-1, 6-2 are each treated as a thin lens, and, when letting f be the focal length of the synthetic system, the following formulae are established:

$$f = f1 \cdot f2/(f1+f2-d)$$

$$\Delta 1 = d \cdot f1/(f1+f2-d)$$

$$\Delta 2 = d \cdot f2/(f1+f2-d)$$

where $\Delta 1$ is the optical distance from the convex lens 6-1 to the front principal plane H of the synthetic system, $\Delta 2$ is the optical distance from the convex lens 6-2 to the rear principal plane H', and d is the optical distance between the convex lens 6-1 and the convex lens 6-2.

Let d1 be the optical distance from the rear end surface 5-2 of the integrator 5 to the front principal plane H of the synthetic system, let d2 be the optical distance from the rear principal plane H' of the synthetic system to the convex lens 8, and let d3 be the distance from the convex lens 8 to the surface of the liquid crystal display panel 10. The following formulae are established:

$$d1 = \Delta 1 + \delta 1$$

$$d2 = \Delta 2 + \delta 2$$

where $\delta 1$ is the optical distance from the rear end surface 5-2 of the integrator 5 to the convex lens 6-1, and $\delta 2$ is the optical distance from the convex lens 6-2 to the front principal plane of the convex lens 8.

Further, the following formula is also established:

$$d3 = [f \cdot d2 - f \cdot d1 \cdot f/(d1-f)]/[d2 - f - d1 \cdot f/(d1-f)] \quad [23']$$

where f is the focal length of the synthetic system, and f' is the focal length of the convex lens 8.

Moreover, the lateral magnification $\beta 4$ is expressed by the following formula:

$$\beta 4 = f \cdot d3/[d2 \cdot (d1-f) - d1 \cdot f] \quad [24']$$

where f is the focal length of the synthetic system, and f' is the focal length of the convex lens 8.

In the present optical system, the following relationships are established:

$$l1 < \beta 4 \cdot L3, \text{ and } l2 < \beta 4 \cdot L4 \quad [25]$$

where L3, L4 are respectively the lengths of the rear end surface 5-2 of the integrator 5 in the liquid crystal display panel long side direction and in the liquid crystal display panel short side direction, and l1, l2 are the lengths of the long side and the short side of the liquid crystal display panel. In particular, it is desirable that the lateral magnification $\beta 4$ be over 1 but under 1.2.

The present integrator 5 is characterized by having such an end surface configuration as to establish the conditions in the formulae [21], [22], [23'], [24'] and [25] and disposing the respective end surfaces in such positions as to establish the above conjugate relationship. Then, the convex lenses 6-1, 6-2 are disposed so that the position of the front end surface 5-1 of the integrator 5 and the position of the reflecting mirror 7 are in the conjugate relationship, and the color separating element 16 is disposed between the convex lens 6-1 and the convex lens 6-2, thereby obtaining the substantially parallel light beams. With this characteristic, the liquid crystal display panel is illuminated with the light beams, wherein there are no or reduced color ununiformity and no or reduced luminance ununiformity.

A further embodiment of the present invention will be explained with reference to FIG. 12.

Figure 12:
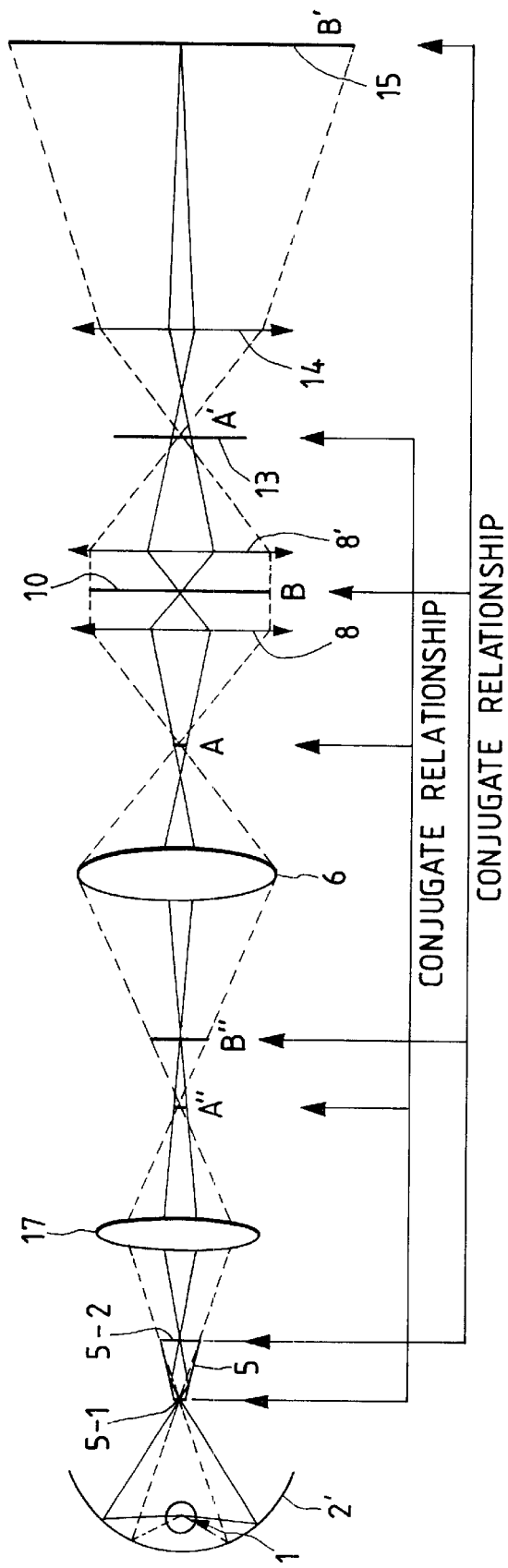
FIG. 12 is an explanatory view of an optical system in a fourth embodiment of the present invention.

FIG. 12 also shows, as in FIG. 7, for an easier comprehension, a transmitting system into which the optical system using the reflection type display panel is converted. FIG. 12 also shows an embodiment in which a transmitting type liquid crystal display panel is used.

In accordance with this embodiment, a convex lens 17 is disposed anterior to the convex lens 6, and image of the light beams from the front end surface 5-1 of the integrator 5 is formed in reduction as a light source image A" through the convex lens 17, while image of the light beams from the rear end surface 5-2 of the integrator 5 is formed in enlargement as an image B" therethrough. Other configurations are the same as those in FIG. 6.

Referring to FIG. 12, the light beams form the light source 1 are reflected and converged by an ellipsoidal reflector 2', to form a light source image in the front end surface position 5-1 of the integrator 5. Of the light beams which have been incident on the integrator 5, a part of some light beams is not reflected inside the integrator 5 but passes therethrough, and the remaining light beams are reflected inwardly once to several times and outgone from the rear end surface 5-2.

Of the light beams from the integrator 5, the light beams from the front end surface 5-1 (the light source image) of the integrator 5 are converged by the convex lens 17 to form an intermediate image A" in front of the convex lens 6, and the light beams from the rear end surface 5-2 of the integrator are likewise converged to form an intermediate image B" in front of the convex lens 6. A relationship between the convex lens 6, the front end surface 5-1 of the integrator 5 and the rear end surface 5-2 thereof thereby come to have a redundancy. The large-sized integrator 5 is used in the embodiment shown in FIG. 7. In this embodiment, however, even if the integrator is small in size, the light source images A and A' can be formed small by use of the proper convex lens 17. Accordingly, the contrast of the display image can be enhanced. Further, image of the rear end surface 5-2 of the integrator 5 is formed in a sufficiently large size on the liquid crystal display panel 10, and the liquid crystal panel can be illuminated with the light beams. Image of the light beams from the front end surface 5-1 of the integrator 5 is formed in reduction as the light source image A" through the convex lens 17, and image of the rear end surface 5-2 is formed in enlargement as the image B". The integrator 5 is thereby downsized and thus decreases in terms of the costs.

The intermediate image of the light source 1 is formed as the light source image A, and the light beams illuminate the liquid crystal display panel 10 via the plano-convex lens 8. The intermediate image B" formed by the light beams from the rear end surface 5-2 of the integrator 5 is, as described above, formed as the image B on the liquid crystal display panel 10 through the convex lens 6 as well as through the plano-convex lens 8. Of the light beams modulated corresponding to the image signals by the liquid crystal display panel 10, the reflected or transmitted light beams, which are not scattered by the liquid crystal, are converged as the light source image A' by the plano-convex lens 8'. Then, the same light beams travel through the aperture of the aperture stop 13 and are projected as the image B' on the screen 15 via the projection lens 14.

In this optical system, as shown in FIG. 12, there exists the conjugate relationship between the position of the light source 1, the position of the front end surface 5-1 of the integrator 5, the position of the intermediate image A" of the light source, the position (the light source image A) in which the reflecting mirror 7 is disposed, and the position (the light source image A') of the aperture stop 13 of the projection lens 14.

The light source image A' is formed in reduction (the lateral magnification β3) by the light beams from the front end surface 5-1 of the integrator 5, and, when letting β' be the image forming magnification of the intermediate image A" through the convex lens 17, $β3=β'·β2·β1$. The above formulae [21], [22] are established as in the embodiment shown in FIG. 7 with respect to the long side and short side directions, wherein L1 and L2 are the lengths of the front end surface 5-1 of the integrator in the liquid crystal display panel long side direction and in the short side direction, n1 is the maximum number of reflections within the integrator 5 in the liquid crystal display panel long side direction, n2 is the maximum number of reflections in the liquid crystal display panel short side direction, D1 is the length of the aperture (a diameter) of the aperture stop in the liquid crystal display panel long side direction with respect to the light beam in each wavelength band, and D2 is the length thereof in the liquid crystal display panel short side direction.

Further, in the present optical system, as shown in FIG. 12, there exists the conjugate relationship between the rear end surface 5-2 of the integrator 5, the intermediate image B" thereof, the liquid crystal display panel surface (the image B) and the screen 15 (the light source image B'). Such as the embodiment shown in FIG. 6, the above formula [23] is established, wherein d1 is the optical distance from the intermediate image B" relative to the rear end surface 5-2 of the integrator 5 to the front side principal plane H of the convex lens 6, d2 is the optical distance from the rear side principal plane H' of the convex lens 6 to the convex lens 8, and d3 is the distance from the convex lens 8 to the liquid crystal surface 10. Further, the lateral magnification β4 of the synthetic system of the convex lenses 6, 8 is expressed by the above formula [24] as in the embodiment in FIG. 7, and the relationship in the formula [25] is also established. Moreover, it is desirable that β4 be 1 or more but 1.2 or less in the formula [25].

The present integrator also has such an end surface configuration as to establish the conditions in the above formulae [21]–[25], and is characterized by disposing the respective end surfaces in such positions as to establish the above conjugate relationship. Further, another characteristic is that the integrator 5 is downsized by adding the convex lens system 17, and the costs can be reduced.

As discussed above, in accordance with each of the embodiments, it is feasible to obviate the problem that the color ununiformity and the luminance ununiformity due to the light source are produced on the screen.

Moreover, the rectangular liquid crystal panel can be effectively illuminated with the light beams through the optical system using the integrator, and the problem that the luminance on the screen decreases can be obviated. It is also possible to actualize the image projecting apparatus by which the image with uniform brightness over the corners of the screen can be obtained.

Furthermore, the light source image formed in the position of the aperture stop of the projection lens can be diminished through the optical system using the integrator, and the it is feasible to enhance both of the contrast and the brightness of the display image.

Moreover, the color separating element having the large incidence angle dependency can be readily introduced owing to the optical system using the integrator.

It is also possible to provide the optical system capable of downsizing the integrator and reducing the costs.

It is apparent that, in this invention, a wide range of different working modes can be formed based on the invention without deviating from the spirit and scope of the invention. This invention is not restricted by its specific working modes except being limited by the appended claims.

What is claimed is:

1. An image projecting apparatus comprising:

a light source;

converging means for converging a light from said light source and forming a light source image;

optical means having a first end surface, a second end surface and a reflecting surface for connecting the first and second end surfaces, and constructed such that the light from said light source is incident on the first end surface, and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

a projection lens for projecting the image from said reflection type optical modulating device onto a screen; and a condenser lens for converging the light modulated by said reflection type optical modulating device at a position of a stop of said projection means, said light deflecting means being disposed in the vicinity of the position of said stop of said projection means;

wherein a position of the first end surface of said optical means and a position of the stop of said projection optical system are set in an optically conjugate relationship, a position of the second end surface of said optical means and a position of said reflection type optical modulating device are set in an optically conjugate relationship, said converging means has a paraboloidal reflector or an ellipsoidal reflector, wherein when said converging means has the paraboloidal reflector, said converging means has a convex lens for converging the light from the paraboloidal reflector and said light source is disposed at a focal point of said paraboloidal reflector, and when said converging means has the ellipsoidal reflector, said light source is disposed at a first focal point of said ellipsoidal reflector and the light source image is formed at a second focal point of said ellipsoidal reflector, and an optical system for setting the first end surface of said optical means and the position of said stop in the optically conjugate relationship, has first and second convex lens systems disposed between the second end surface of said optical means and said reflection type optical modulating device, and a third convex lens system disposed between said reflection type optical modulating device and the position of said stop wherein said optical system having said first convex lens system, said second convex lens system and said third convex lens system, forms an image of the first end surface of said optical means in the position of said stop so as to satisfy the following conditions:

$D1 \geq \beta \cdot (2n1+1) \cdot L1 \geq 2.5\ D1$ $D1 \geq \beta \cdot (2n2+1) \cdot L2 \geq 2.5\ D2$ where $\beta$ is the image forming magnification of said optical system having said first convex lens system, said second convex lens system and said third convex lens system, L1 is the length of the first end surface in a long side direction of said reflection type optical modulating device, L2 is the length of the first end surface in a short side direction of said reflection type optical modulating device, n1 is the maximum number of reflections within said optical means in the long side direction of said reflection type optical modulating device, n2 is the maximum number of reflections within said optical means in the short side direction of said reflection type optical modulating device, D1 is the length of an aperture of said stop in the long side direction of said reflection type optical modulating device, and D2 is the length of the aperture of said stop in the short side direction of said reflection type optical modulating device.

2. An image projecting apparatus comprising:

a light source;

converging means for converging a light from said light source and forming a light source image;

optical means having a first end surface, a second end surface and a reflecting surface for connecting the first and second end surfaces, and constructed so that the light from said light source is incident on the first end surface, and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

a projection lens for projecting an image of said reflection type optical modulating device onto a screen; and a condenser lens for converging the light modulated by said reflection type optical modulating device at a position of a stop of said projection lens, said light deflecting means being disposed in the vicinity of the position of said stop of said projection lens;

wherein the first end surface of said optical means is disposed in a position where the light source image is formed, a position of the first end surface of said optical means and a position of said light deflecting means are set in an optically conjugate relationship, a position of said light deflecting means and the position of said stop of said projection lens are set in an optically conjugate relationship, a position of the second end surface of said optical means and the position of said reflection type optical modulating device are set in an optically conjugate relationship; and wherein an optical system for setting the first end surface of said optical means and the position of said stop in the optically conjugate relationship, has first and second convex lens systems disposed between the second end surface of said optical means and said reflection type optical modulating device, and a third convex lens system disposed between said reflection type optical modulating device and the position of said stop wherein said optical system having a first convex lens system and said second convex lens system, forms an image of the first end surface of said optical means in the position of said stop so as to satisfy the following conditions:

$D1 \geq \beta 1 \cdot \beta 2 \cdot (2n1+1) \cdot L1 \geq 2.5\ D1$ $D1 \geq \beta 1 \cdot \beta 2 \cdot (2n2+1) \cdot L2 \geq 2.5\ D2$ where $\beta$ is the image forming magnification of said first convex lens system, $\beta 2$ is the image forming magnification of said second convex lens system, L1 is the length of the first end surface in a long side direction of said reflection type optical modulating device, L2 is the length of the first end surface in a short side direction of said reflection type optical modulating device, n1 is the maximum number of reflections within said optical means in the long side direction of said reflection type optical modulating device, n2 is the maximum number of reflections within said optical means in the short side direction of said reflection type optical modulating device, D1 is the length of the aperture of said stop in the long side direction of said reflection type optical modulating device, and D2 is the length of the aperture of said stop in the short side direction of said reflection type optical modulating device.

3. An image projecting apparatus comprising:

a light source;

converging means for converging a light from said light source and forming a light source image;

optical means having a first end surface, a second end surface and a reflecting surface for connecting the first and second end surfaces and constructed such that the light from said light source is incident on the first end surface and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

a projection lens for projecting the image from said reflection type optical modulating device onto a screen; and a condenser lens for converging the light modulated by said reflection type optical modulating device at a position of a stop of said projection means, said light deflecting means being disposed in the vicinity of the position of said stop of said projection means;

wherein a position of the first end surface of said optical means and a position of the stop of said projection optical system are set in an optically conjugate relationship, a position of the second end surface of said optical means and a position of said reflection type optical modulating device are set in an optically conjugate relationship, said converging means has a paraboloidal reflector or an ellipsoidal reflector, wherein when said converging means has the paraboloidal reflector, said converging means has a convex lens for converging the light from the paraboloidal reflector and said light source is disposed at a focal point of said paraboloidal reflector, and when said converging means has the ellipsoidal reflector, said light source is disposed at a first focal point of said ellipsoidal reflector and the light source image is formed at a second focal point of said ellipsoidal reflector, and an optical system for setting the first end surface of said optical means and the position of said stop in the optically conjugate relationship, has first and second convex lens systems disposed between the second end surface of said optical means and said reflection type optical modulating device, and a third convex lens system disposed between said reflection type optical modulating device and the position of said stop wherein said optical system having said first convex lens system and said second convex lens system forms an image of the second end surface of said optical means on said reflection type optical modulating device so as to satisfy the following conditions:

$$e1 < \beta 4 \cdot L3$$

$$e1 < \beta 4 \cdot L4$$

where $\beta 4$ is the image forming magnification of said optical system having said first convex lens system and said second convex lens system, e1 is the length of said reflection type optical modulating device in a long side direction, e2 is the length of said reflection type optical modulating device in a short side direction, L3 is the length of the second end surface of said optical means in the long side direction of said reflection type optical modulating device, and L4 is the length of the second end surface of said optical means in the short side direction of said reflection type optical modulating device.

4. An image projecting apparatus comprising:

a light source;

converging means for converging a light from said light source and forming a light source image;

optical means having a first end surface, a second end surface and a reflecting surface for connecting the first and second end surfaces, and constructed such that the light from said light source is incident on the first end surface, and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

a projection lens for projecting the image from said reflection type optical modulating device onto a screen; and a condenser lens for converging the light modulated by said reflection type optical modulating device at a position of a stop of said projection means, said light deflecting means being disposed in the vicinity of the position of said stop of said projection means;

wherein a position of the first end surface of said optical means and a position of the stop of said projection optical system are set in an optically conjugate relationship, a position of the second end surface of said optical means and a position of said reflection type optical modulating device are set in an optically conjugate relationship, said converging means has a paraboloidal reflector or an ellipsoidal reflector, wherein when said converging means has the paraboloidal reflector, said converging means has a convex lens for converging the light from the paraboloidal reflector and said light source is disposed at a focal point of said paraboloidal reflector, and when said converging means has the ellipsoidal reflector, said light source is disposed at a first focal point of said ellipsoidal reflector and the light source image is formed at a second focal point of said ellipsoidal reflector, and an optical system for setting the first end surface of said optical means and the position of said stop in the optically conjugate relationship, has first and second convex lens systems disposed between the second end surface of said optical means and said reflection type optical modulating device, and a third convex lens system disposed between said reflection type optical modulating device and the position of said stop wherein said optical system having said first convex lens system and said second convex lens system forms an image of the second end surface of said optical means on said reflection type optical modulating device so as to satisfy the following conditions:

$$e1 < \beta 4 \cdot L3$$

$$e1 < \beta 4 \cdot L4$$

where $\beta 4$ is the image forming magnification of said optical system having said first convex lens system and said second convex lens system, e1 is the length of said reflection type optical modulating device in a long side direction, e2 is the length of said reflection type optical modulating device in a short side direction, L3 is the length of the second end surface of said optical means in the long side direction of said reflection type optical modulating device, and L4 is the length of the second end surface of said optical means in the short side direction of said reflection type optical modulating device wherein the image forming magnification of said optical system having said first convex lens system and said second convex lens system is 1 or above but 1.2 or under.

5. An image projecting apparatus comprising:

a light source;

converging means for converging a light from said light source and forming a light source image;

optical means having a first end surface, a second end surface and a reflecting surface for connecting the first and second end surfaces, and constructed such that the light from said light source is incident on the first end surface, and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

a projection lens for projecting the image from said reflection type optical modulating device onto a screen; and a condenser lens for converging the light modulated by said reflection type optical modulating device at a position of a stop of said projection means, said light deflecting means being disposed in the vicinity of the position of said stop of said projection means;

wherein a position of the first end surface of said optical means and a position of the stop of said projection optical system are set in an optically conjugate relationship, a position of the second end surface of said optical means and a position of said reflection type optical modulating device are set in an optically conjugate relationship, said converging means has a paraboloidal reflector or an ellipsoidal reflector, wherein when said converging means has the paraboloidal reflector, said converging means has a convex lens for converging the light from the paraboloidal reflector and said light source is disposed at a focal point of said paraboloidal reflector, and when said converging means has the ellipsoidal reflector, said light source is disposed at a first focal point of said ellipsoidal reflector and the light source image is formed at a second focal point of said ellipsoidal reflector, and an optical system for setting the first end surface of said optical means and the position of said stop in the optically conjugate relationship, has first and second convex lens systems disposed between the second end surface of said optical means and said reflection type optical modulating device, and a third convex lens system disposed between said reflection type optical modulating device and the position of said stop wherein said first convex lens system has a convex lens system A and a convex lens system B, the second end surface of said optical means is disposed at a front focal point of said convex lens system A, and the light beams from the second end surface are substantially collimated by said convex lens system A wherein said optical system having said convex lens system A, said convex lens system B, said second convex lens system and said third convex lens system, forms an image of the first end surface of said optical means in the position of said stop so as to satisfy the following conditions:

$$D1 \leq \beta1 \cdot \beta2 \cdot (2n1)+1) \cdot L1 < 2.5\, D1$$

$$D2 \leq \beta1 \cdot \beta2 \cdot (2n2)+1) \cdot L2 < 2.5\, D2$$

wherein $\beta1=f2/f1$, f1 is the focal length of said convex lens system A, f2 is the focal length of said convex lens system B, $\beta2$ is the image forming magnification of said optical system having said second convex lens system and said third convex lens system, L1 is the length of the first end surface in a long side direction of said reflection type optical modulating device, L2 is the length of the first end surface in a short side direction of said reflection type optical modulating device, n1 is the maximum number of reflections within said optical means in the long side direction of said reflection type optical modulating device, n2 is the maximum number of reflections within said optical means in the short side direction of said reflection type optical modulating device, D1 is the length of the aperture of said stop in the long side direction of said reflection type optical modulating device, and D2 is the length of the aperture of said stop in the short side direction of said reflection type optical modulating device.

6. An image projecting apparatus comprising:

a light source;

converging means for converging a light from said light source and forming a light source image;

optical means having a first end surface, a second end surface and a reflecting surface for connecting the first and second end surfaces, and constructed such that the light from said light source is incident on the first end surface, and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

projection means for projecting the image from said reflection type optical modulating device onto a screen; and a condenser lens for converging the light modulated by said reflection type optical modulating device at a position of a stop of said projection means, said light deflecting means being disposed in the vicinity of the position of said stop of said projection means;

wherein the first end surface of said optical means is disposed in a position where the light source image is formed, a position of the first end surface of said optical means and a position of said light deflecting means are set in an optically conjugate relationship, a position of said light deflecting means and the position of said stop of said projection means are set in an optically conjugate relationship, a position of the second end surface of said optical means and the position of said reflection type optical modulating device are set in an optically conjugate relationship, an optical system for setting the first end surface of said optical means and the position of said light deflecting means in the optically conjugate relationship, has a first convex lens system disposed between the second end surface of said optical means and said light deflecting means, and wherein an optical system for setting the position of said light deflecting means and the position of said stop in the optically conjugate relationship, has a second convex lens system disposed between said light deflecting means and said reflection type optical modulating device wherein said first convex lens system has a convex lens system A and a convex lens system B, the first end surface of said optical means is disposed at a front focal point of said convex lens system A, and the light beams from the second end surface are substantially collimated by said convex lens system A wherein said optical system having said convex lens system A, said convex lens system B and said second convex lens system, forms an image of first end surface of said optical means in the position of said stop so as to satisfy the following conditions:

$$D1 \leq \beta1 \cdot \beta2 \cdot (2n1)+1) \cdot L1 \leq 2.5\, D1$$

$$D2 \leq \beta1 \cdot \beta2 \cdot (2n2)+1) \cdot L2 \leq 2.5\, D2$$

wherein $\beta1 = f2/f1$, f1 is the focal length of said convex lens system A, f2 is the focal length of said convex lens system B, $\beta2$ is the image forming magnification of said second convex lens system, L1 is the length of the first end surface in a long side direction of said reflection type optical modulating device, L2 is the length of the first end surface in a short side direction of said reflection type optical modulating device, n1 is the maximum number of reflections within said optical means in the long side direction of said reflection type optical modulating device, n2 is the maximum number of reflections within said optical means in the short side direction of said reflection type optical modulating device, D1 is the length of the aperture of said stop in the long side direction of said reflection type optical modulating device, and D2 is the length of the aperture of said stop in the short side direction of said reflection type optical modulating device.

7. An image projecting apparatus comprising:

a light source;

converging means for converging a light from said light source and forming a light source image;

optical means having a first end surface, a second end surface and a reflecting surface for connecting the first and second end surfaces, and constructed such that the light from said light source is incident on the first end surface, and at least a part of the light is reflected by the reflecting surface and emerges from the second end surface;

a reflection type optical modulating device for reflectively modulating the light from the second end surface and for forming a reflection light which has an image information;

light deflecting means for deflecting the light from the second end surface of said optical means and guiding the deflected light to said reflection type optical modulating device;

a projection lens for projecting the image from said reflection type optical modulating device onto a screen; and a condenser lens for converging the light modulated by said reflection type optical modulating device at a position of a stop of said projection means, said light deflecting means being disposed in the vicinity of the position of said stop of said projection means;

wherein a position of the first end surface of said optical means and a position of the stop of said projection optical system are set in an optically conjugate relationship, a position of the second end surface of said optical means and a position of said reflection type optical modulating device are set in an optically conjugate relationship, said converging means has a paraboloidal reflector or an ellipsoidal reflector, wherein when said converging means has the paraboloidal reflector, said converging means has a convex lens for converging the light from the paraboloidal reflector and said light source is disposed at a focal point of said paraboloidal reflector, and when said converging means has the ellipsoidal reflector, said light source is disposed at a first focal point of said ellipsoidal reflector and the light source image is formed at a second focal point of said ellipsoidal reflector, and an optical system for setting the first end surface of said optical means and the position of said stop in the optically conjugate relationship, has first and second convex lens systems disposed between the second end surface of said optical means and said reflection type optical modulating device, and a third convex lens system disposed between said reflection type optical modulating device and the position of said stop wherein said first convex lens system is constructed of a convex lens system A and a convex lens system B, and said convex lens system A forms in reduction an image of the first end surface of said optical means as a first intermediate image, forms in enlargement an image of the light beams from the second end surface of said optical means as a second intermediate image, reforms the first intermediate image in the position of said stop through an optical system having said second convex lens system and said third convex lens system, and reforms the second intermediate image on said optical modulating device through an optical system having said second convex lens system and said third convex lens system, and reforms the second intermediate image on said optical modulating device through an optical system having said convex lens system and said second convex lens system wherein said optical system having said convex lens system A, said convex lens system B, said second convex lens system and said third convex lens system, forms an image of the first end surface of said optical means in the position of said stop so as to satisfy the following conditions:

$$D1 \leq \beta' \cdot \beta'' \cdot \beta2 \cdot (2n1+1) \cdot L1 < 2.5\, D1$$

$$D2 \leq \beta' \cdot \beta'' \cdot \beta2 \cdot (2n2)+1) \cdot L2 < 2.5\, D2$$

where $\beta'$ is the image forming magnification of said convex lens system A, $\beta''$ is the image forming magnification of said convex lens system B, $\beta2$ is the image forming magnification of said optical system having said second convex lens system and said third convex lens system, L1 is the length of the first end surface in a long side direction of said reflection type optical modulating device, L2 is the length of the first end surface in a short side direction of said reflection type optical modulating device, n1 is the maximum number of reflections within said optical means in the long side direction of said reflection type optical modulating device, n2 is the maximum number of reflections within said optical means in the short side direction of said reflection type optical modulating device, D1 is the length of the aperture of said stop in the long side direction of said reflection type optical modulating device, and D2 is the length of the aperture of said stop in the short side direction of said reflection type optical modulating device.

* * * * *

UNITED STATES PATENT AND TRADEMARK OFFICE
CERTIFICATE OF CORRECTION

PATENT NO. : 6,260,974 B1
DATED : July 17, 2001
INVENTOR(S) : Osamu Koyama

It is certified that error appears in the above-identified patent and that said Letters Patent is hereby corrected as shown below:

Column 7,
Line 42, delete "$\beta3=\beta2 \cdot \oplus 1$," and insert therefor -- $\beta3=\beta2 \cdot 1$, --

Column 11,
Line 32, delete "facilitates" and insert therefor -- facilitate --

Column 13,
Line 67, delete "In" and insert therefor -- in --

Column 14,
Line 36, delete "lens 81" and insert therefor -- lens 8' --

Column 23,
Line 65, delete "$D1 \leq \beta1 \cdot \beta2 \cdot (2n1)+1) \cdot L1 < 2.5\ D1$" and insert therefor -- $D1 \leq \beta1 \cdot \beta2 \cdot (2n1)+1) \cdot L1 \leq 2.5\ D1$ --
Line 67, delete "$D2 \leq \beta1 \cdot \beta2 \cdot (2n2)+1) \cdot L2 < 2.5\ D2$" and insert therfor -- $D2 \leq \beta1 \cdot \beta2 \cdot (2n2)+1) \cdot L2 \leq 2.5\ D2$ --

Column 26,
Line 42, delete "$D1 \leqq \beta' \cdot \beta'' \cdot \beta2 \cdot (2n1+1) \cdot L1 < 2.5\ D1$" and insert therefor -- $D1 \leq \beta' \cdot \beta'' \cdot \beta2 \cdot (2n1)+1) \cdot L1 \leq 2.5\ D1$ --
Line 44, delete "$D2 \leqq \beta' \cdot \beta'' \cdot \beta2(2n2)+1) \cdot L2 < 2.5\ D2$" and insert therefor -- $D2 \leq \beta' \cdot \beta'' \cdot \beta2 \cdot (2n2)+1) \cdot L2 \leq 2.5\ D2$ --

Signed and Sealed this

Eighth Day of October, 2002

Attest:

*Attesting Officer*

JAMES E. ROGAN
*Director of the United States Patent and Trademark Office*